March 13, 1934.  R. THOMSON  1,950,704
MEANS FOR CUTTING EXTERNAL SCREW THREADS
Filed Oct. 10, 1931  2 Sheets-Sheet 1
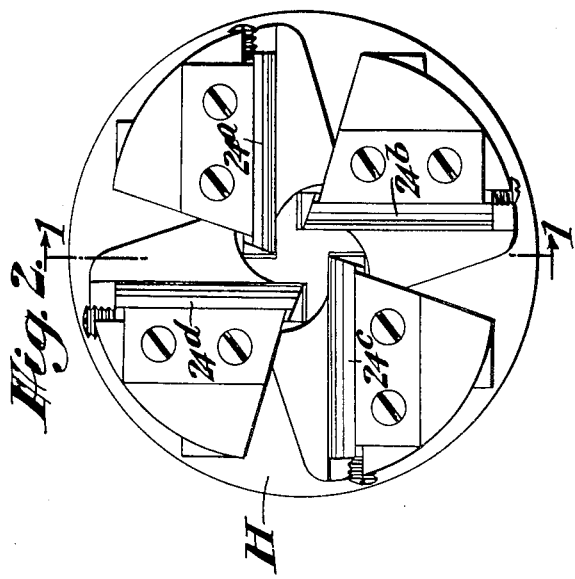
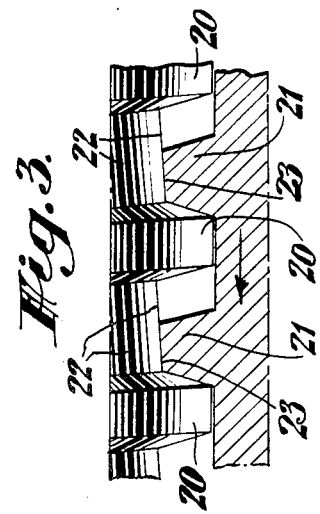
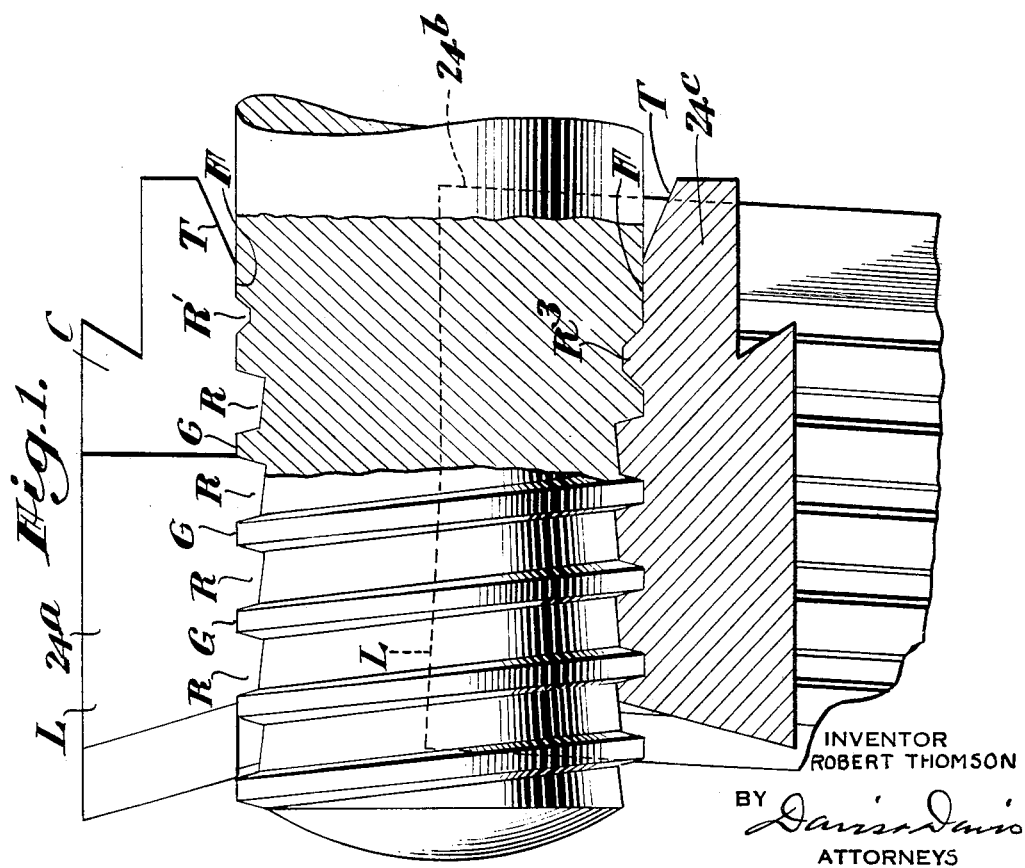
INVENTOR
ROBERT THOMSON March 13, 1934. R. THOMSON 1,950,704
MEANS FOR CUTTING EXTERNAL SCREW THREADS
Filed Oct. 10, 1931 2 Sheets-Sheet 2
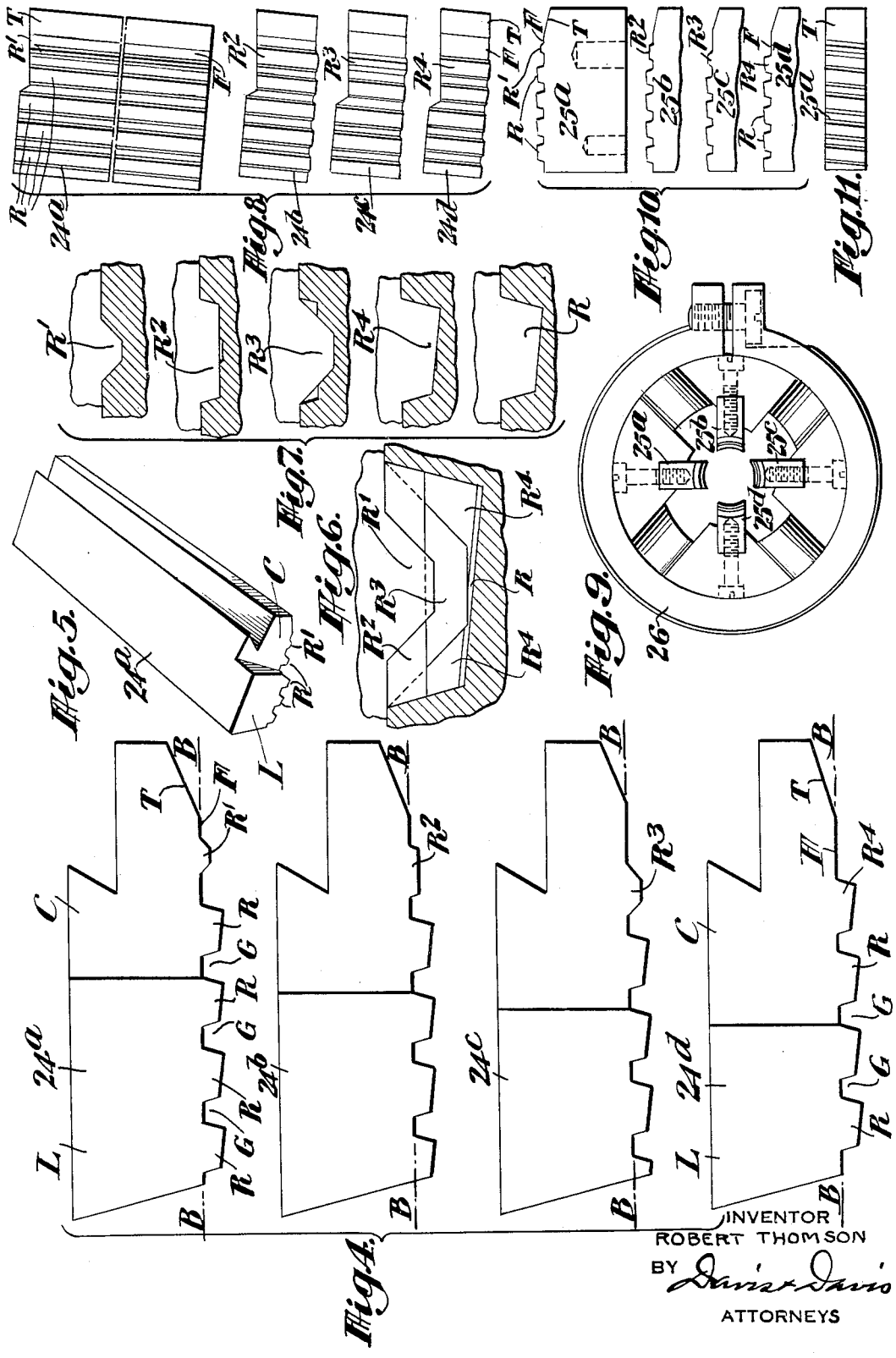
INVENTOR
ROBERT THOMSON
BY
ATTORNEYS Patented Mar. 13, 1934

1,950,704

UNITED STATES PATENT OFFICE 1,950,704

MEANS FOR CUTTING EXTERNAL SCREW THREADS

Robert Thomson, Arlington, N. J., assignor to Dardelet Threadlock Corporation, New York, N. Y., a corporation of Delaware Application October 10, 1931, Serial No. 568,035

2 Claims. (Cl. 10—111)

Important objects of the present invention are, to provide means for cutting more accurate screw threads upon distorted stock, to provide means for more accurately cutting screw threads upon sheared bolt blanks whose tips are often materially distorted in cross section by the shearing operation, and to provide means for accurately cutting self-locking screw threads of the well-known Dardelet type upon sheared bolt blanks.

Other objects of the invention will appear hereinafter.

In the drawings, Fig. 1 is a fragmentary sectional view on the line 1—1 of Fig. 2, showing a bolt thread being chased on stock by the chasers of a die of the type having bar-like chasers disposed in the die head tangentially to the cutting circle of the die;

Fig. 2 a view of the entering end of a well-known type of rotary die in which my thread-cutting improvements are embodied;

Fig. 3 a fragmentary view, partly in longitudinal section, showing a Dardelet nut thread in locked position on a Dardelet bolt thread;

Fig. 4 a view showing the active or cutting ends of the four chasers of the die of Figs. 1 and 2;

Fig. 5 a perspective view of the uppermost chaser of Fig. 4;

Fig. 6 a diagrammatic view showing the cutting profiles of the groove developing ribs superposed;

Fig. 7 a view showing, upon an enlarged scale, the cutting action of the ribs of the four chasers in developing the thread groove;

Fig. 8 a plan view showing the grooved face of the first chaser and end portions of the grooved faces of the other chasers;

Fig. 9 a view of the entering end of a well-known type of rotary die of the kind having radially arranged chasers grooved across their inner ends;

Fig. 10 a side view of the improved chasers in the die shown in Fig. 9; and

Fig. 11 a view of the grooved end of the uppermost chaser of Fig. 10.

In the commercial Dardelet system of threading, the external and internal threads, as of a bolt and nut, for example, as shown in Fig. 3, are of equal pitch, the rib 20 of the bolt thread and the rib 21 of the nut thread have steep side walls making an angle of fourteen and one-half degrees with the perpendicular to the thread axis, the ribs are much narrower than the thread groove, the bolt thread has a slightly conoidal root surface 22 making an angle of six degrees with the thread axis, and the nut thread has a correspondingly inclined conoidal crest surface 23. When the nut is turned upon the bolt without axial advance, as when tightening the nut, the nut thread is displaced crosswise of the bolt thread, as shown in Fig. 3. Thereby the nut thread crest surface 23 becomes tightly wedged and self-locked upon the bolt thread root surface 22 under elastic tension and one face of the nut thread is brought into abutment with that side face of the bolt thread which faces away from the entering end of the bolt. The crest surface of the bolt thread and root surface of the nut thread lie parallel with the thread axis.

The construction shown in Figs. 1, 2, 4, 5, 6, 7 and 8 will first be described. The die shown in these views is of the type disclosed in United States Patents No. 409,208 and No. 864,964, wherein the serrated chasers 24$^a$, 24$^b$, 24$^c$ and 24$^d$ are bar-like chasers arranged tangentially to the cutting circle, with their thread ribs extending parallel with the longitudinal side edges of the chasers. The chaser bars are rigidly clamped in the die head and are canted in the well-known manner so that the ribs extend at an angle to the axis of the cutting circle corresponding with, or approximately with, the helix angle of the thread to be cut. Further description of the die head and the chaser mounting is thought to be unnecessary as the parts and their mountings as so far described are old and well-known.

In the improved chasers for the die just described, each chaser has a series of parallel thread ribs or teeth which extend longitudinally of the chaser and parallel with its longitudinal side edges. The ribs upon each chaser include a leading rib located nearest the leading edge of the chaser and designated $R^1$, $R^2$, $R^3$ and $R^4$ upon the successive chasers, and following ribs R. All of the ribs upon each chaser have a common base line B as indicated in Fig. 4. Each chaser has also a beveled throat surface T extending inward from its leading side edge toward said leading rib of the chaser. Said throat surface T has the same angle and width on all of the four chasers of the die and intersects the common base line or plane B of the series of ribs short of the leading rib of the series. The several series of ribs on the successive chasers of the series of four are progressively offset from the leading side edges of the chasers in the usual manner so that the active or innermost end of the ribs will lie in a helical path around the die axis to form the interrupted internal cutting thread or helical series of successively cutting teeth of the die when the chasers are assembled in the usual manner in the die head H.

The throat surface T of each chaser is connected with the leading rib by a flat or plane surface F coincident with the base line B of the ribs and the flat bottom of the grooves G between the ribs. The surfaces F are of progressively increasing width in successive chasers, having the least width on the uppermost chaser of Fig. 4 and the greatest width on the lowermost chaser of said figure. The chasers are shown in Fig. 4 in the order from top to bottom in which they act to progressively develop the thread profile. The flat bottoms of thread grooves G of the chasers are all located the same distance from the plane of the usual flat backs. The several ribs R of each chaser are of equal height or depth and the height of these ribs is the same on all the chasers of the die, the profile of the ribs R being identical with that of the groove of the completed Dardelet thread.

The leading rib $R^1$ of the first chaser $24^a$ is an initial groove center cutter. It has flat opposite sides equally and oppositely inclined at a sharp angle to the base line B, and a flat top parallel to said line. In the present instance the angle of inclination of the sides is forty-five degrees, the depth or height of the rib is more than one-half the depth of the thread groove to be cut and the width of the rib is materially less than the groove width. The leading rib $R^2$ of the following chaser $24^b$ is an initial groove side cutter. It has flat opposite sides equally and oppositely inclined at an angle of fourteen and one-half degrees to the base line, and a flat top parallel to the base line. Its depth is slightly less than that of the rib $R^1$ and its width corresponds to that of the groove to be cut. The leading rib $R^3$ of the following chaser $24^c$ is a groove center cutter similar in form to the first rib R but larger in cross section. It has a depth only slightly less than the groove depth and a width at the base line equal, in the present instance, to the groove width at said line. These proportions may be varied, however. The leading rib $R^4$ upon the following chaser $24^d$ is a groove side cutter equal to the thread groove in width and having flat sides diverging toward the base line and each making an angle of fourteen and one-half degrees with the perpendicular to the base line, and of slightly less depth than the groove. This rib has a flat top inclined in the present instance at an angle of six degrees to the base line in an opposite direction to the inclination of the throat surface T.

The ribs R of all the chasers also have flat sides diverging toward the base line B and a flat top inclined in the same direction as the top of the rib $R^4$ and also making an angle of six degrees with the base line for cutting standard Dardelet threads. Ribs R are slightly deeper than rib $R^4$, being the full depth of the thread groove to be cut. All of the ribs R and the ribs $R^2$ and $R^4$ are the same width at the base, and the grooves G between the ribs R and the grooves between the ribs $R^2$ and $R^4$ and the adjacent ribs R are all the same width at the base.

The active or innermost ends of the chasers are ground back to provide the usual beveled or relieved cutting end face C and guide end portion or lead-off portion L on each chaser. In each chaser the face C is extended inward from the leading side edge of the chaser to a point beyond the leading one of the series of full height, inclined top ribs R, and said face C lies in a plane making an angle with the longitudinal side edges of the chaser equal to the helix angle of the thread the chaser is profiled to cut. The active cutting edges of the chasers thus lie parallel with the axis of the die and piece being threaded while the end portion L slightly projects beyond the line of cut for more efficient action as a guide or lead screw, as indicated by dotted lines in Fig. 1 and as will be apparent from inspection of Fig. 2. The chasers are so disposed in the die head as to locate the cutting ends of the groove center cutting ribs $R^1$ and $R^3$ diametrically opposite each other and to locate the cutting ends of the groove side cutting ribs $R^2$ and $R^4$ diametrically opposite each other upon a diameter at a right angle to that of ribs $R^1$ and $R^3$.

The chasers have been designed primarily to cut accurate Dardelet threads upon bolt blanks which have been sheared from a long rod. Such blanks have their tips materially distorted out of round by the transverse shearing pressure. Usually the tip is distorted into a three-cornered or three-lobed form in cross section, and dies employed heretofore failed to properly grip the distorted tip and cut threads with accurate round root surfaces and a rib of the proper thickness at the tip. The bolt blank was free to vibrate transversely in the die and recede somewhat from the cutting ribs or teeth. Consequently the ribs failed to cut deeply enough and the thread root surface at the tip of the bolt had raised spots. Sometimes these raised spots would interfere with the free screwing of the nut upon the bolt tip. Also, the insufficiently gripped blank would sometimes vibrate longitudinally and cause the thread rib to be cut thinner than the normal width at the tip of the bolt. The chuck supporting the bolt blank is usually pressed forward manually to feed the blank into the die and if the blank is not firmly gripped by the die the block is thrust rearward by the cutting resistance and said thinning of the thread rib occurs at the tip. The improved chasers have been designed to firmly grip the stock, prevent both transverse and longitudinal vibration and ensure the cutting of an accurate thread. In a Dardelet bolt thread it is most desirable that the inclined root surface be accurately formed for proper locking cooperation with the inclined crest surface of the nut thread.

In operation, the inner end edges of throat surfaces T of the chasers will act as cutting and guiding edges to center and guide in an oversized piece or blank and taper it down when necessary, and the chaser portions F of the chasers will, when necessary, act as cutting edges to bring oversized or distorted stock to proper nominal diameter in advance of the starting of a thread groove in the piece. The leading rib $R^1$, being the most advanced of the leading ribs, first engages the piece and makes an initial central groove cut of approximately V form, of material depth and entirely clear of the groove sides, the following rib $R^2$, of greater width than rib $R^1$ and of nearly equal depth, trims away the metal at opposite sides of the first cut and develops the opposite sides of the thread groove for approximately half the depth of the groove. The following tapered rib $R^3$ makes a central cut reaching to almost the bottom of the groove and entirely clear of the groove sides. The following rib $R^4$ trims away the metal at opposite sides of said second central cut and develops the groove sides to almost the bottom of the groove.

The rib R⁴ is followed by the particular rib R of the first chaser 24ª nearest to the initial cutting rib R¹. This rib R completes the bottom and sides of the groove and is required to take only a narrow chip. The following ribs R of the chasers follow in the completed groove and serve to guide the piece and finish off the groove.

It will be observed that the leading ribs of the chasers are proportioned for deep penetration and positive gripping of the piece without the taking of an objectionably large chip by any one of said ribs. The chips taken by the four ribs are very nearly equal, while the final groove bottom cut which develops the important inclined root surface of the thread is desirably thin to ensure very accurate cutting. The wedge-like groove center cutting ribs firmly grip the piece while the groove side cutting ribs are cutting, and all four of the deeply penetrating leading ribs firmly grip the piece while the groove bottom cutting rib is cutting. Therefore the thread developed will, throughout its length, be accurate in pitch, have an accurately formed root surface with no high spots, and have a rib of uniform thickness. It will be understood that the production of an accurate groove upon the distorted tip of the piece not only prevents objectionable high spots upon the thread root and objectionable thinning of the rib but also causes the groove to accurately fit the guide ribs R of the chasers and thereby ensures accurate guiding of the piece through the die and accurate cutting of the following turns of the thread.

The modified construction of the die shown in Figs. 9, 10 and 11 is similar to the die shown in United States Patent No. 1,111,412, except that the inner edges of the series of chasers 25ª, 25ᵇ, 25ᶜ and 25ᵈ are profiled as heretofore described in connection with chasers 24ª, 24ᵇ, 24ᶜ and 24ᵈ in accordance with this invention. As shown, this die is of the type wherein the chaser bars are arranged radially in the die head 26 and are in effect segments of a nut, the grooves and ribs and surfaces F and T extending across the concave inner end edges of the chaser bars, said grooves and ribs forming an interrupted cutting thread as is usual in this type of die. It will be obvious that the invention may be embodied in other types of thread cutters than those shown.

What I claim is:

1. A screw thread cutting die having an internal interrupted cutting thread which is of constant pitch and root diameter and whose successive cutting portions have identical cutting profiles except in the thread convolution nearest the leading end of the die, in which thread convolution cutting portions are reduced at both sides from root to crest of the thread and are also so reduced in height as to decrease in height in the order of their approach to the leading end of the die and alternate with cutting portions which are reduced solely in height and decrease in height in the order of their approach to the leading end of the die, the amount of reduction in height of the several reduced cutting portions being so varied that tracking top parts of said reduced cutting portions alternately approach the die axis and recede therefrom, each of the unreduced cutting portions and the reduced cutting portion farthest from the leading end of the die having a top cutting edge which inclines toward the die axis in the direction of the leading end of the die, and each of the remaining reduced cutting portions having a top cutting edge which lies parallel to the die axis.

2. A screw thread cutting die having all of its thread cutting teeth arranged around the die axis in a helical path to cut successively, the leading tooth and each one of a plurality of immediately successive ones of the teeth in said path having a top cutting edge which lies parallel to the die axis, each of the remaining teeth in said path having a top cutting edge which inclines toward the die axis in the direction of the leading end of the die, that one of said remaining teeth which is nearest the leading end of the die having its top farther from the die axis than the others of said remaining teeth, alternate ones of those teeth whose top cutting edges lie parallel to the die axis being reduced at both sides from top to bottom relatively to all the other teeth in said path and each having a top part thereof extending closer to the die axis than a tracking part of the top cutting edge of the tooth next farther along said path from the leading end of the die, said teeth which are reduced at their sides including the first and last tooth in the path having a top cutting edge which lies parallel to the die axis.

ROBERT THOMSON.